United States Patent
Fudala et al.

(10) Patent No.: US 7,455,524 B1
(45) Date of Patent: Nov. 25, 2008

(54) SIGNALLING INTERCONNECT

(75) Inventors: Chris J. Fudala, Macomb, MI (US);
Robert W. Ruby, Clarkston, MI (US);
Michael James McCann, Adrian, MI (US)

(73) Assignee: Thule Towing Systems, L.L.C., Lodi, CA (US)

( * ) Notice: Subject to any disclaimer, the term of this patent is extended or adjusted under 35 U.S.C. 154(b) by 0 days.

(21) Appl. No.: 11/747,835

(22) Filed: May 11, 2007

(51) Int. Cl.
*H01R 33/00* (2006.01)
(52) U.S. Cl. .......................................... 439/35; 280/422
(58) Field of Classification Search .................... 439/35, 439/34; 280/422, 477
See application file for complete search history.

(56) References Cited

U.S. PATENT DOCUMENTS

| | | | |
|---|---|---|---|
| 2,143,322 A * | 1/1939 | Knobel, Jr. ................. | 280/513 |
| 3,858,907 A * | 1/1975 | Van Raden .................. | 280/422 |
| 5,288,094 A | 2/1994 | Putnam | |
| 5,407,219 A | 4/1995 | Chiu | |
| 5,580,076 A * | 12/1996 | DeRoule et al. .......... | 280/406.2 |
| 5,732,966 A | 3/1998 | Menard et al. | |
| 5,824,960 A * | 10/1998 | Markling .................... | 174/135 |
| 5,904,261 A | 5/1999 | Belinky et al. | |
| 6,019,386 A | 2/2000 | Morelock | |
| 6,076,691 A | 6/2000 | Belinky et al. | |
| 6,080,014 A | 6/2000 | Steiler | |
| 6,089,907 A | 7/2000 | Shoblom | |
| 6,951,346 B2 * | 10/2005 | Brackett et al. .......... | 280/491.2 |
| 7,168,956 B2 | 1/2007 | Charnesky | |
| 2001/0050471 A1* | 12/2001 | McCoy et al. ............... | 280/504 |
| 2005/0074989 A1* | 4/2005 | Pancheri ...................... | 439/35 |
| 2005/0225053 A1* | 10/2005 | Roll et al. ................. | 280/491.3 |

* cited by examiner

*Primary Examiner*—Michael C Zarroli
(74) *Attorney, Agent, or Firm*—Novak Druce + Quigg, LLP

(57) ABSTRACT

A connector assembly for supplying power and transmitting signals from a vehicle to a towed trailer or other towed equipment. The connector assembly comprises a trailer hitch having a cross tube extending horizontally behind the vehicle. The cross tube has a wall separating an inside cavity from an outside surface of the cross tube. A first connector attached to the outside surface or mounted in a first opening in the wall of the cross tube has a connecting portion outwardly of the outside surface. Likewise, a second connector mounted at the outside surface or in a second opening in the wall of the cross tube has a connecting portion outwardly of the outside surface of the trailer hitch. One or more conduits extend across the inside cavity between the first and second connectors for interconnecting the vehicle to the towed trailer for supplying power and transmitting signals between them.

19 Claims, 5 Drawing Sheets

SIGNALLING INTERCONNECT

TECHNICAL FIELD

The present invention relates generally to connecting structures for delivering signals and electrical power, from a towing vehicle to a towed vehicle or trailer and related equipment on the trailer. More specifically the invention relates to surface mounting a connector to a trailer hitch with associated conduits or conductors passing through holes formed in a tubular portion of the trailer hitch, or mounting the connector so that the tubular portion also encloses a portion of the body of the installed connector to provide convenient access to the connector while protecting it from damage.

BACKGROUND

A variety of accessories are available for mounting to vehicles depending on the preferences of the vehicle owner operator. One frequently added option is a towing hitch that facilitates pulling of general purpose trailers, other motor vehicles, camper-trailer combinations and trailer homes and the like. These trailer hitches generally have a crossbar, also referred to as a torsion tube, positioned substantially at the rear of the vehicle. The hitch typically lies close to the ground, substantially beneath the vehicle, exposed to an environment that could include water, dust, snow, road salts, and the like. In addition to environmental problems the hitch structure is susceptible to damage by impact with surfaces and objects when the vehicle is stationary or moving. Environmental exposure and impact damage causes the hitch structure to exhibit signs of corrosion and dents or other forms of disfigurement that detracts from the appearance of the vehicle and its external equipment. Furthermore, accessories that are associated with the hitch can be more susceptible to damage because of their location and support mechanisms.

During operation of a vehicle towing a trailer or other equipment, there is usually a requirement to pass electrical signals from the vehicle to the towed equipment to energize brakes, brake lights, running lights, turn signal lights, and similar components that require electrical power. A suitable means for transmitting energy uses electrical conductors in cable form routed to the rear of the vehicle for termination in a connector located at or near the trailer hitch of the towing vehicle. The connector configuration usually complies with industry standard designs to facilitate connection with an oppositely configured connector used to terminate conductors from components—brake lights, turn signal lights and the like—of the towed equipment. Interconnection of the connectors from the vehicle and the towed equipment provides the electrical supply needed to energize the components of the towed equipment.

It is known to mount the terminating connector of the tow vehicle cable to the vehicle bumper or other connector retention structure conveniently positioned at the rear of the vehicle in a suitable position for mating connection with the cable connector of the towed equipment. Retaining means for the towing vehicle's terminating connector is described in United States patents including U.S. Pat. Nos. 5,129,828; 5,380,209; 5,407,219; 5,593,170; 5,732,966; 5,904,261; 6,076,691 and 6,089,907. The references indicate that integral positioning of an electrical connector with a trailer hitch has required the use of an external bracket or box. These retaining means include an accessory, or cover or box or like container attached to the hitch structure as housing for the terminating connector. Such retaining means prevent ingress of environmental contaminants but they also tend to protrude from the hitch surface becoming more susceptible to impact damage.

In view of the above described deficiencies associated with the use of known designs for signal and power supply connections between vehicles, the present invention was developed to alleviate these drawbacks and provide further benefits to the user. These enhancements and benefits relate to alternative embodiments of the present invention, described in greater detail herein below.

SUMMARY

The present invention in its several disclosed embodiments alleviates the drawbacks described above with respect to conventionally designed signal transmitting interconnections and incorporates several additionally beneficial features. Of particular interest are benefits from the use of a trailer hitch structure for internal positioning and protection of wiring and associated systems that provide signal transmission and an electrical feed from a towing vehicle to towed equipment such as a trailer attached to the trailer hitch.

In one exemplary embodiment, the present description discloses an arrangement for accommodating electrical signal transmissions from a power vehicle to a hitched unit interconnected with the vehicle. The arrangement includes an elongate load-bearing hitch member configured to be stationarily (not necessarily permanently) connected at a rear end of a powered vehicle in a predominantly (mostly, but not necessarily in its entirety) horizontal orientation. The hitch member has a wall portion that defines an inside cavity separated by the wall portion from an outside surface of the wall portion. It should be appreciated that the inside cavity is not necessarily fully enclosed, but is at least partially bounded by the wall portion. An electrical connector is stationarily connected to the hitch member at an opening through the wall portion and electrical wiring is interconnected with the electrical connector and extends within the inside cavity.

The electrical connector includes a body portion located at least partially within the opening. The opening has an interior surface that is characterized by laser-cutting artifacts indicative of the fact that the opening has been previously cut using laser technology.

Further, the elongate hitch member extends between two opposite distal ends thereof and in an installed configuration on a powered vehicle, the elongate hitch member extends across a predominance of a width of the vehicle. Each of the two opposite distal ends of the elongate hitch member terminates in a mounting bracket. As shown, a receiving tube is integrally constructed with the elongate hitch member and located at a lengthwise center of the elongate hitch member.

As intimated, the trailer hitch includes a crossbar having mounting brackets for secure attachment of the trailer hitch to the rear of a towing vehicle. In one embodiment a receiving tube, positioned at the approximate mid-point of the crossbar, provides coupling between the towing vehicle and equipment under tow, such as a trailer having a load arm to be inserted and secured in the receiving tube.

It will be appreciated that the crossbar could be formed from a solid bar or cylinder. For the purposes of the present invention, however, it is preferred that the crossbar comprises an elongate tube having a wall of sufficient thickness to withstand stresses operating on the trailer hitch during towing. A benefit of a tubular crossbar in accordance with the present invention is the capability for through-wall mounting of a first connector and a second connector so that a portion of each connector extends from the outer surface of the crossbar into its internal cavity to provide protection and limit damage to the connectors. Depending on the size of the connectors and aperture dimensions for through-wall mounting, the connectors could be mounted against the outside or outer surface of the crossbar. The first connector is connected to the second connector through the positioning of one or more conduits or wires in the internal cavity of the tubular crossbar between the first connector and the second connector. A connecting unit comprising the first connector, the second connector and associated conduits provide an interconnect in accordance with the present invention.

During signal and power transmission from the towing vehicle to the towed equipment, a wiring harness plug of the towing vehicle inserted in the receptacle of the second connector provides signal transmission and power passing through the conduits or wires, inside the cavity of the tubular crossbar, to the first connector that has a receptacle to receive a plug supplying power and related signals to the lights, turn signals and other components of the towed equipment. Other than conduits transferring electrical power between the towing vehicle and towed equipment, signal carrying conduits could include those for providing sound and video signals to a camping trailer or fifth-wheel and signals related to back-up warning devices included at the rear or in a bumper of the towed equipment. In other words the use of the connecting unit and interconnect described herein is not limited to electrical interconnecting structures from the towing vehicle to the towed equipment.

It will also be appreciated that the first and second connectors could be plugs while the towing vehicle wiring harness and the signal supply to the towed equipment could be in the form of receptacles, i.e. the invention is not limited to particular plug and receptacle combinations. Connecting structures from the towing vehicle wiring harness and wiring schemes of the towed equipment to the connecting unit in accordance with the present invention could include intervening sets of wires. Such intervening wires, referred to herein as sub-harnesses or adapters may be vehicle-specific to facilitate mating connection from the hitch connecting unit to the vehicle wiring harness or the towed equipment signal supply.

Production of trailer hitches with through-hole mounted signal connectors can be achieved using a variety of optional aperture forming processes including known milling techniques and laser cutting using a laser cutter available from TRUMPF INC. Farmington, Conn., for example, which penetrates the tubular crossbar to form precise openings to receive connecting units. Laser cutting or other machining of the tube allows installation of connectors integrally mounted in the wall of the crossbar or at its outer surface to provide an embodiment according to the present invention having at least two connectors protruding from the surface of the crossbar of the trailer hitch. Suitable positioning of integral connectors, offset or opposite or adjacent to each other, on the surface of the crossbar allows convenient interconnection of the towing vehicle's wiring harness to wiring schemes used in towed equipment, including trailers, camping trailers, fifth wheels and the like. As an alternative, one or other or both of the connectors could be replaced by wires, referred to herein as pigtails, exiting from inside the tubular crossbar via machined through-holes formed in the wall of the crossbar to provide flexible connection between vehicle wiring harness, through the cross bar to the wiring scheme of the towed equipment.

Another embodiment, in accordance with the present invention, places connectors flush with the external surface of the tubular crossbar in a straight portion of the crossbar to maintain the strength of the trailer hitch to support the towed equipment. The strength of the trailer hitch needs to withstand the loading and torsion forces associated with vehicles and equipment under tow, in addition to the static loading conditions.

More particularly, the present invention provides an assembly for transmitting signals from a vehicle to a towed unit. The assembly comprises a trailer hitch having an inside cavity separated from an outside surface; a first connector; a second connector; and at least one signal transmitting conduit located in the inside cavity between the first connector and the second connector for interconnection of the vehicle and the towed unit for transmitting signals therebetween. Signals transmitted from the vehicle to the towed unit include electrical signals providing power to the towed unit. The trailer hitch includes a cross tube comprising a wall separating the inside cavity from the outside surface wherein the cross tube extends substantially horizontally behind the vehicle. Included in the cross tube are a first opening to receive the first connector and a second opening to receive the second connector. Machining, selected from milling and laser cutting, is used to form the first and second openings. The first connector has a body portion sized for retention in the first opening, the second connector having a body portion sized for retention in the second opening and both connectors are available for access at the outside surface.

In other embodiments, the present invention contemplates connectors mounted on the surface of the hitch and where no portion of the connector extends into the inside cavity of the cross tube. At least one conduit provides signal transmission between the body portion of the first connector and the body portion of the second connector allowing interconnection of the vehicle to the towed unit. In at least one embodiment, it is envisaged that a part of the body portion of each of the first connector and the second connector extends into the inside cavity. The first connector further includes a first plate covering the first opening with a first edge portion abutting the outside surface of the first opening and the second connector further includes a second plate covering the second opening with a second edge portion abutting the outside surface of the second opening. In accordance with the present invention, the towing unit is selected from the group consisting of towed equipment and towed trailers and towed vehicles and towed campers. Additionally, other electrical components such as video cameras, reverse lights, and proximity sensors may also be accommodated using the cross tube for a mounting surface and having electrical connections extending into the cross tube.

The present invention in one embodiment provides a connector assembly for supplying power and transmitting signals from a vehicle to a towed trailer. The connector assembly comprises a trailer hitch having a cross tube extending horizontally behind the vehicle, the cross tube having a wall separating an inside cavity from an outside surface of the cross tube. A first connector mounted in a first opening in the wall of the cross tube has a connecting portion outwardly of the outside surface and in abutment therewith. Similarly, a second connector mounted in a second opening in the wall of the cross tube has a connecting portion outwardly of the outside surface and in abutment therewith. A plurality of conduits extending across the inside cavity between the first connector and the second connector provides interconnection of the vehicle to the towed trailer for supplying power and transmitting signals therebetween.

In another embodiment, a connector assembly for transmitting signals from a vehicle to a towed trailer comprises a trailer hitch having a cross tube that extends horizontally behind the vehicle, the cross tube having a wall separating an inside cavity from an outside surface of the cross tube. A first connector located substantially in the inside cavity has a first plate outwardly of the outside surface and in abutment therewith. Similarly, a second connector located substantially in the inside cavity has a second plate outwardly of the outside surface and in abutment therewith. Between the first connector and the second connector there is at least one conduit extending across the inside cavity for interconnection of the vehicle to the towed trailer for transmitting signals.

Yet another embodiment, in accordance with the present invention, provides a connector assembly for transmitting signals from a vehicle to towed equipment in which the connector assembly comprises a trailer hitch having a first opening and a second opening formed in a cross tube that extends horizontally behind the vehicle. The cross tube has a wall separating an inside cavity from an outside surface of the cross tube. A first connector has a body portion sized to fit in the first opening extending into the cavity of the cross tube. The first connector includes a first plate covering the first opening and has a first edge portion abutting the outside surface surrounding the first opening. Similarly, a second connector has a body portion sized to fit in the second opening to extend into the cavity of the cross tube. The second connector includes a second plate covering the second opening and having a second edge portion abutting the outside surface surrounding the second opening. At least one conduit connects the body portion of the first connector to the body portion of the second connector for signal transmission to allow interconnection of the vehicle to the towed equipment for transmitting signals therebetween.

A further embodiment, according to the present invention, is a connector assembly for transmitting signals from a vehicle to a towed unit. The connector assembly comprises a trailer hitch having a first opening and a second opening formed by laser cutting a cross tube that extends horizontally behind the vehicle. The cross tube has a wall separating an inside cavity from an outside surface of the cross tube. A first connector has a body portion sized to fit in the first opening with extension into the cavity of the cross tube. The first connector includes a first plate covering the first opening and having a first edge portion abutting the outside surface surrounding the first opening. In like fashion, a second connector has a body portion sized to fit in the second opening to extend into the cavity of the cross tube. The second connector includes a second plate covering the second opening and having a second edge portion abutting the outside surface surrounding the second opening. At least one conduit provides signal transmission between the body portion of the first connector and the body portion of the second connector allowing interconnection of the vehicle to the towed unit for transmitting signals therebetween.

An additional embodiment according to the present invention providing a signal transmission system from a towing vehicle to a towed unit comprises a connecting unit having a first connector connected to a second connector by at least one conduit carrying signals including electrical power signals, audio signals, video signals and communication signals and the like. The at least one conduit resides in an inside cavity formed in a cross tube of a trailer hitch. A wall separates the inside cavity from the outside surface of the cross tube. The signal transmission system includes a wiring harness, from the towing vehicle that includes a harness connector designed for mating engagement with the second connector. A towed unit wiring connector provides mating engagement with the first connector providing power and signal transmission from the towing vehicle, through the harness connector via the at least one conduit of the connecting unit to the towed unit.

Yet another embodiment according to the present invention is an assembly for transmitting signals from a vehicle to a towed unit. The assembly comprises a trailer hitch including a cross tube comprising a wall separating an inside cavity from an outside surface. Attached to the outside wall are a first connector and a second connector. At least one signal transmitting conduit passes through the inside cavity between a first opening and a second opening, formed in the wall, to connect the first connector to the second connector. The first connector is located adjacent to the first opening and the second connector is located adjacent to the second opening for interconnection of the vehicle and the towed unit for transmitting signals therebetween. Signals transmitted to the towed unit include electrical signals providing power to the towed unit. The cross tube, extending substantially horizontally behind the vehicle has the first and second openings formed therein by a machining process selected from milling and laser cutting.

The beneficial effects described above apply generally to the exemplary devices and mechanisms disclosed herein of the connector assembly. The specific structures through which these benefits are delivered will be described in detail hereinbelow.

BRIEF DESCRIPTION OF THE DRAWINGS

The invention will now be described in greater detail in the following way of example only and with reference to the attached drawings, in which.

DETAILED DESCRIPTION OF THE INVENTION

Detailed embodiments of the present invention are disclosed herein; however, it is to be understood that the disclosed embodiments are merely exemplary of the invention that may be embodied in various and alternative forms. The figures are not necessarily to scale and some features may be exaggerated or minimized to show details of particular components. Therefore, specific structural and functional details disclosed herein are not to be interpreted as limiting, but merely as a basis for the claims and as a representative basis for teaching one skilled in the art to variously employ the present invention.

Figure 1:
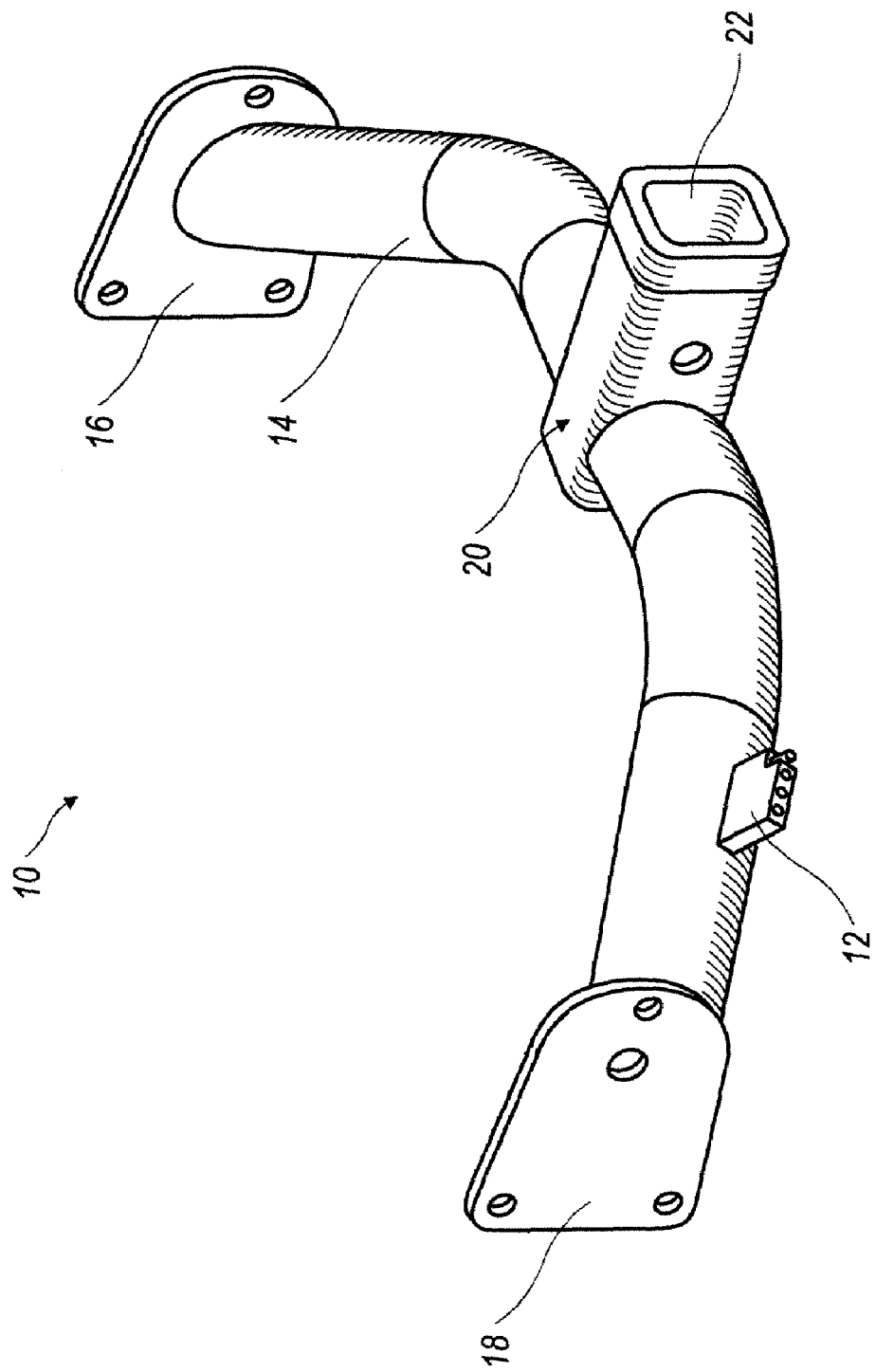
FIG. 1 is a perspective view of a trailer hitch according to the present invention showing a connector mounted in a portion of a tubular crossbar.

Referring to the figures, wherein like numbers refer to like parts throughout the several views, FIG. 1 is a perspective view of a trailer hitch 10 according to the present invention showing a first connector 12 mounted on a portion of a crossbar 14. The trailer hitch 10 includes mounting brackets 16, 18, one at each end of the crossbar 14 for secure attachment of the trailer hitch 10 to the rear of a towing vehicle. As illustrated in FIG. 1, the trailer hitch 10 includes a receiving tube 20 that is characteristic of a receiving type hitch. Positioned at the approximate mid-point of the crossbar 14, the receiving tube 20 provides coupling between the towing vehicle and equipment under tow, such as a trailer having a load arm (not shown) to be inserted and secured against the inside 22 of the receiving tube 20.

It will be appreciated that the crossbar 14 could be formed from a solid bar or cylinder. However, for the purposes of the present invention, it is preferred that the crossbar 14 comprises an elongate tube having a wall 28 (FIG. 3) of sufficient thickness to withstand stresses operating on the trailer hitch 10 during towing. A benefit of a tubular crossbar 14, also referred to herein as a cross tube, in accordance with the present invention is the capability for through-wall mounting of the first connector 12 so that a portion of the connector 12 extends from the outer surface of the crossbar 14 into its internal cavity to provide protection and limit damage to the first connector 12. While in other embodiments of the present invention, the first connector 12 may not extend into the internal cavity of the crossbar 14. Thus, the hitch is capable of providing protection to the connectors, located on the hitch, from damage associated with the location beneath the vehicle.

Figure 2:
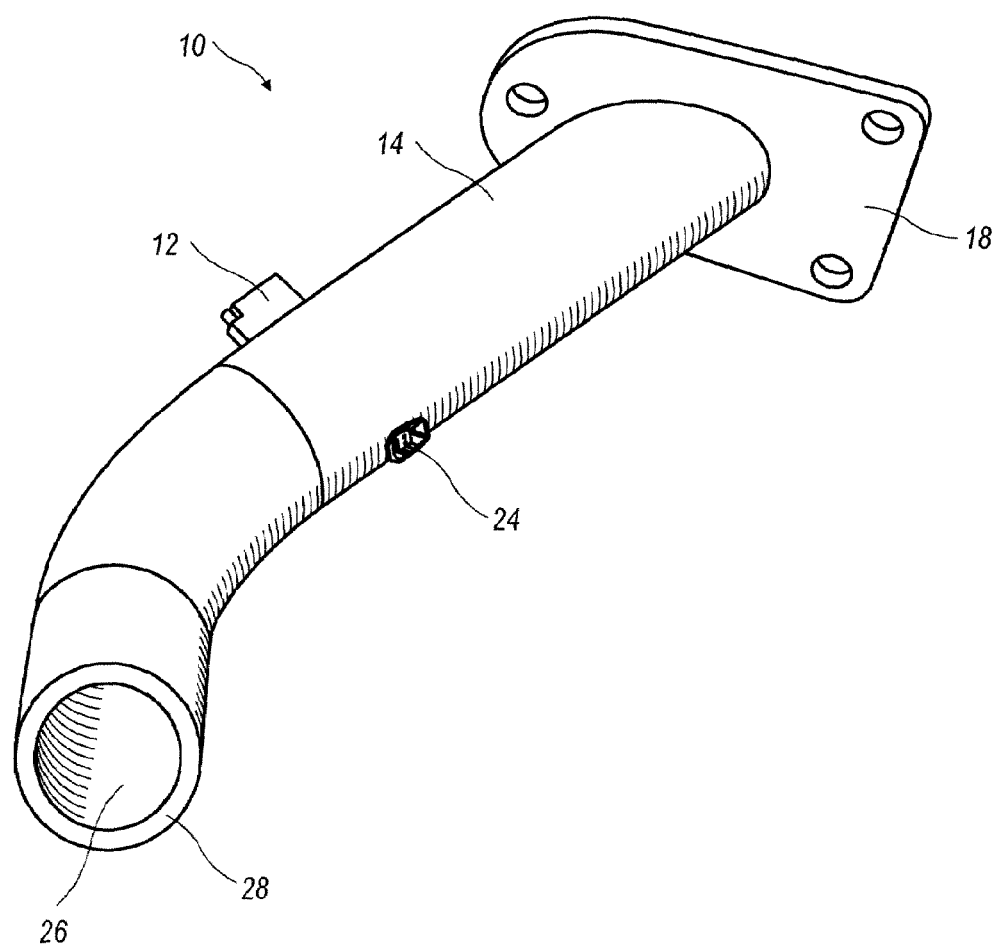
FIG. 2 provides a perspective view of a portion of a trailer hitch according to the present invention showing connectors mounted on opposite sides of a tubular crossbar.
Figure 3:
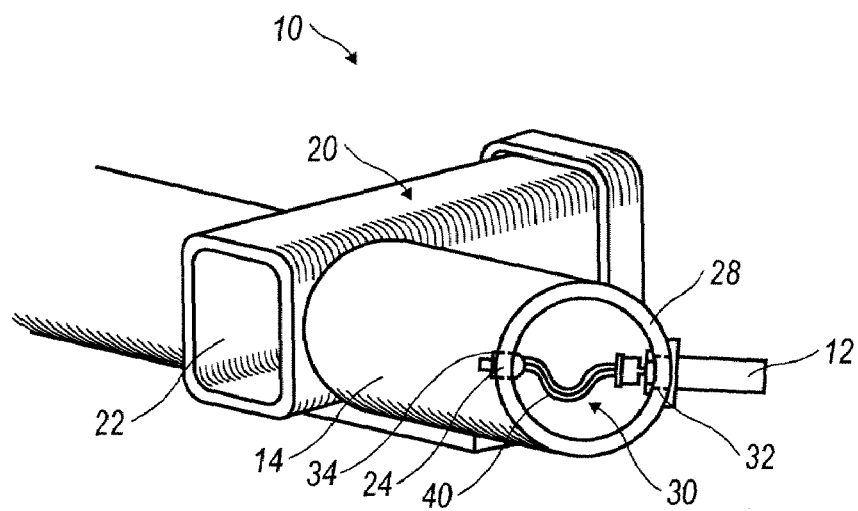
FIG. 3 is a partial cross section view through the tubular crossbar of a trailer hitch according to the present invention to illustrate the presence of a conduit, such as an electrical wire, between connectors mounted on opposite sides of the tubular crossbar.

FIG. 2 and FIG. 3 show optional views of the portion of the trailer hitch 10 that contains the first connector 12. These views show a second connector 24 mounted through the wall 28 of the tubular crossbar 14 opposite the first connector 12. One or more conduits 40 or wires provide connection between the first connector 12 and the second connector 24. A connecting unit 30 comprising the first connector 12, the second connector 24 and associated conduits 40 provide an interconnect for signal and power transmission from the towing vehicle to the towed equipment. While these connectors are generally shown opposite one another, the connectors can be located along different portions of the cross bar, such that they are not located substantially opposite one another. Optional mounting positions for the connectors 12, 24 includes side by side and offset positioning around the circumference of the cross tube 14.

In one embodiment in accordance with the present invention, a signal transmission system, e.g. a wiring harness, from the towing vehicle includes a harness connector (not shown) designed for mating engagement with the second connector 24. Upon attachment of towed equipment to the trailer hitch 10, power and signal transmission from the towing vehicle occurs by mating engagement of a suitable trailer wiring connector (not shown), for example, with the first connector 12 to allow signal transmission and electrical power transmission through the harness connector via the conduits of the connecting unit 30 to the first connector 12 and thence to the trailer or towed vehicle.

FIG. 3 provides added detail of the connecting unit 30 that includes signal transmitting conduits or electrical wires 40 to allow signals and power to pass from the second connector 24 to the first connector 12. The cross section of FIG. 3 indicates the through-wall mounting of the first 12 and second 24 connectors for relatively rigid retention of the connectors 12, 24 in a first wall portion 32 and a second wall portion 34 respectively of the tubular crossbar 14. It will be appreciated by those having pertinent skill that through-wall mounting of connectors 12, 24 could lower the integrity of the tubular crossbar 14 depending on the size of the connectors 12, 24 and apertures required to accommodate them. For this reason, one embodiment of the present invention uses connectors 12, 24 attached to the outer surface of the crossbar 14 using known fasteners including rivets, screws, nut and bolt combinations and the like. The use of surface mounting allows reduction of aperture dimensions providing holes sized to accommodate wires 40 passing through the crossbar 14 without compromising the strength of the tubular crossbar 14.

Figure 4:
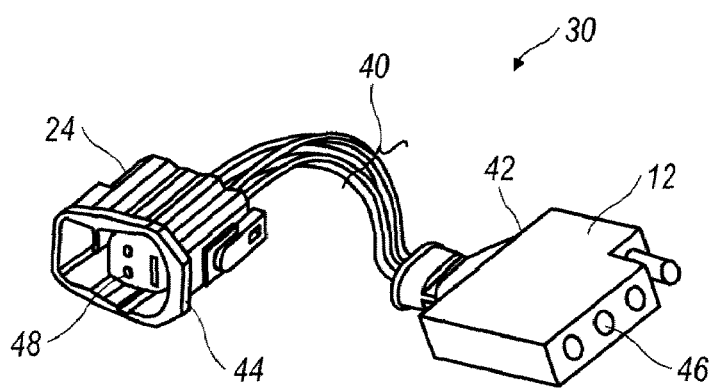
FIG. 4 is a perspective view of a connecting unit mountable to a trailer hitch according to the present invention for interconnection of signal transmission lines between a towing vehicle and trailer or towed vehicle.

FIG. 4 is a perspective view of the connecting unit 30 mountable in the tubular cross bar 14 of the trailer hitch 10 according to the present invention. The connecting unit 30 includes the first connector 12, the second connector 24 and a plurality of wires 40, depending on the number of sockets in the receptacle portion 46, 48 of each or the first and second connectors 12, 24 respectively. Standard plug and receptacle combinations include plugs with four, five, six or seven pins for connection with receptacles providing the corresponding number of sockets. Beyond standard plug and receptacle combinations, a connecting unit 30 could also be modified for application to custom signal transmission needs, such as may be the case where a video camera, reverse lights, proximity detectors, or other specialized electronic equipment is provided in connection with the trailer hitch 30.

Through-wall mounting of the first 12 and second 24 connectors in the first and second wall portions 32 34 respectively requires precise machining of the tubular cross bar 14 for rigid retention of the connectors 12, 24. For this purpose, the present invention uses either a milling technique or a laser machining process employing a laser cutter available from TRUMPF INC. Farmington, Conn., for example, to provide precision cutting of holes of the required dimensions in the wall 28 of the cross bar 14. The use of laser machining has application allowing precision cut holes for mounting cameras, lights including back-up lights and the like that may be mounted to the trailer hitch cross tube. Also, the cross tube provides a mounting platform for back-up sensors. Essentially anything that could be mounted either in or on a vehicle bumper could be installed via the trailer hitch. An advantage of the use of precision machining is the production of tubular crossbars 14 or cross tubes that retain required strength to withstand bending and torsion forces applied to the trailer hitch 10 during movement of towed equipment by the towing vehicle. This feature is a benefit of the precision machining or laser cutting process in accordance with the present invention that produces holes accurately sized to receive conduits 40 and pigtails 58 (FIGS. 5 & 7) or for retention of the first connector 12 and the second connector 24, as described above. Methods for retention of the connectors 12, 24 include friction fit, and the use of common retainers including rivets and screws and nuts and bolts and the like.

Another approach to avoid weakening the tubular crossbar 14 in accordance with the present invention requires positioning the connectors 12, 24 through holes machined at a safe distance from lower strength sections of the crossbar 14 such as bends that could be further weakened by inclusion of one or more connector-accommodating holes.

Figure 5:
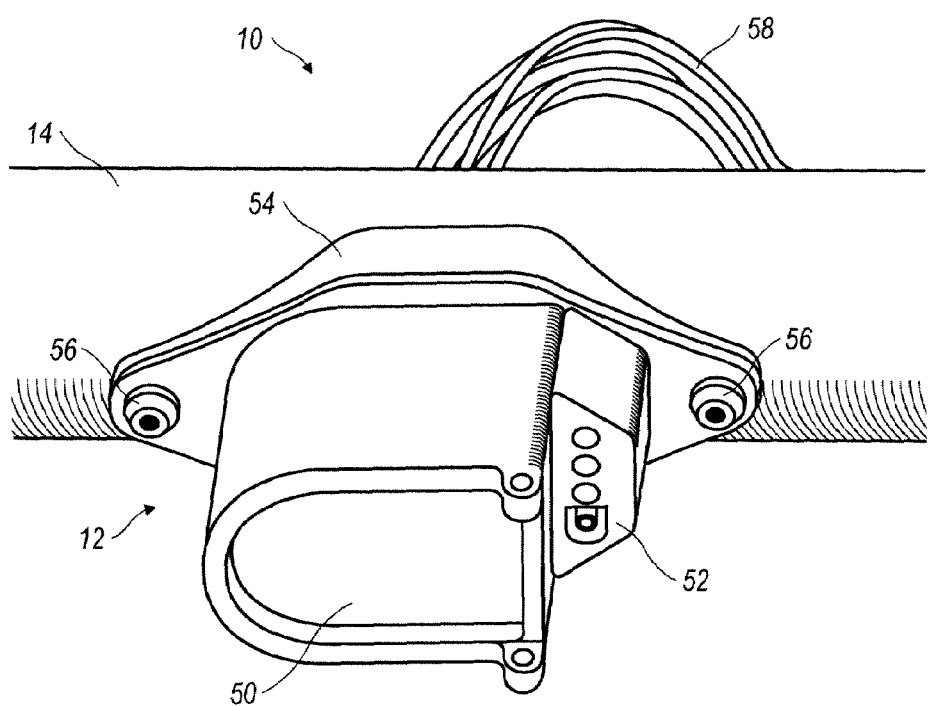
FIG. 5 is a perspective view of a trailer hitch according to the present invention showing a combination connector mounted in a portion of a tubular crossbar.

FIG. 5 illustrates an alternative embodiment in accordance with the present invention wherein the first connector 12 is a combination connector providing multiple signal feed. As shown, the first connector 12 comprises a seven-way connector 50 and a four-way connector 52. It is also known in the art to refer to these connectors as a "7-way round" connector 50 and a "4-way flat" connector 52. The combination of the seven-way connector 50 with the four-way connector 52 is exemplary for illustration purposes. Other combination connectors may be employed without departing from the scope of the present invention. Attachment of the combination connector to the trailer hitch 10 uses a contoured flange 54 including a seat portion that has a profile matching the circumference of the tubular crossbar 14. The profile of the contoured flange 54, limits wobble in the connector 12 after affixing it to the tubular crossbar 14 using rivets 56 as exemplary fasteners.

Another difference of the alternative interconnect of FIG. 5 is the use of an exit hole 70 (FIG. 7) for pigtail wires 58 that facilitate connection of the first connector 12 to the power and signal supplies of the towing vehicle. Pigtail wires 58 have connection at one end to the first connector 12 extending from behind the first connector 12 through the exit hole 70 to protrude from the tubular crossbar 14 for making signal and power connections as indicated previously. To prevent frictional damage to the pigtail wires 58, the edge of the exit hole 70 could be protected by a rubber grommet for example.

Figure 6:
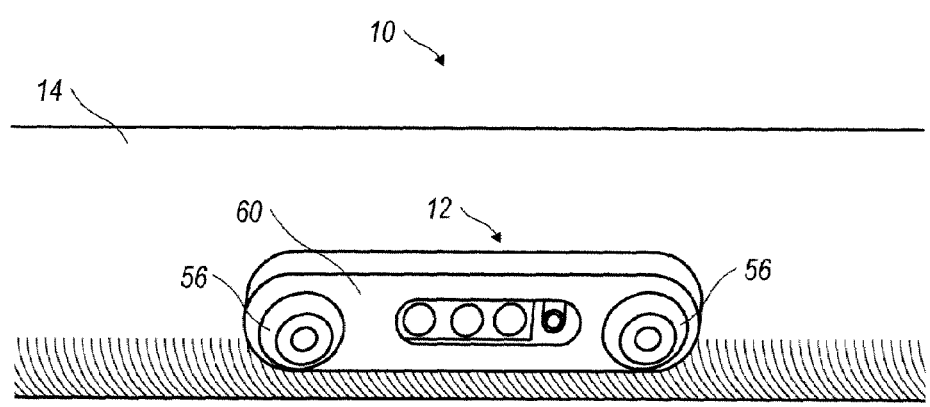
FIG. 6 is a perspective view showing a connector in accordance with the present invention mounted substantially flush to the tubular crossbar.

FIG. 6 illustrates another embodiment of the present invention. With previous embodiments, the first connector 12 has the appearance of protruding outwardly on the outside surface of the tubular crossbar 14. The first connector 12 of FIG. 6 differs by use of a flat connector 60 mounted so that it presents a relatively low profile at the outside of the tubular crossbar 14. Although illustrated as a 4-way flat connector 60, it will be appreciated that the present invention is not limited to the exemplary flat connector 60 or the use of rivets 56 as exemplary fasteners for attaching the flat connector 60 to the tubular crossbar 14.

Figure 7:
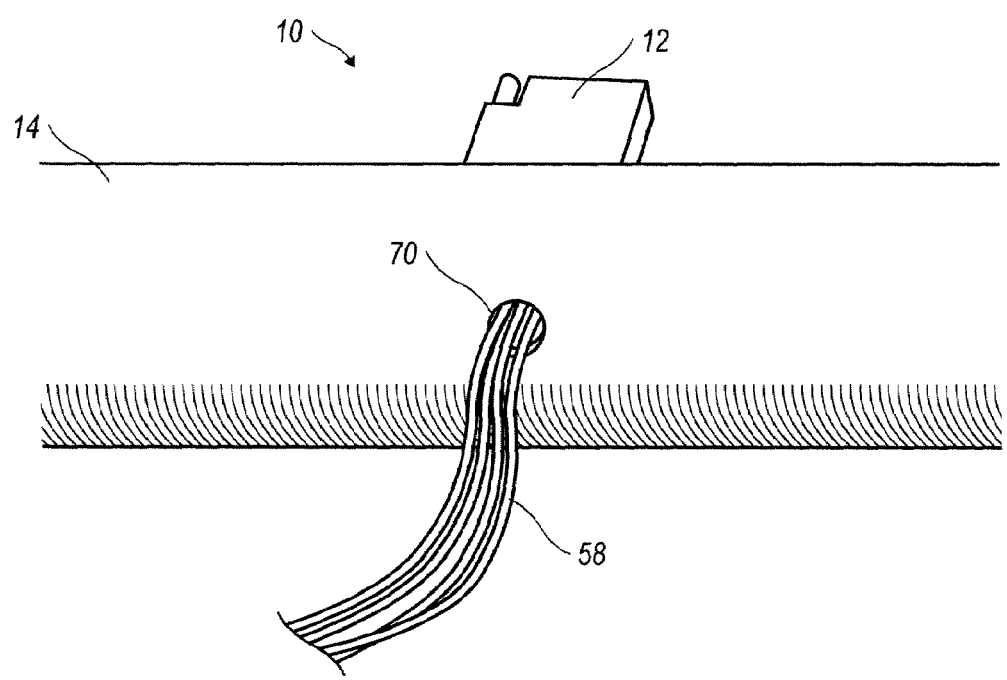
FIG. 7 is a perspective view of a pigtail connecting unit mountable to a trailer hitch according to the present invention for interconnection of signal transmission lines between a towing vehicle and trailer or towed vehicle.

FIG. 7 clarifies the through-hole mounting for pigtail wires 58 that facilitate connection of the first connector 12 to the power and signal supplies of the towing vehicle. Pigtail wires 58 have connection to the first connector 12, extending therefrom across the inside of the tubular crossbar 14 and made available for connection of power and signal wires from the towing vehicle after passing through the exit hole 70. Since the exit hole 70 could have sharp edges, it is advisable to cover them by installing a pliable grommet to minimize damage resulting from pigtail wires 58 rubbing against the edges of the exit hole 70.

A connector assembly for supplying power and transmitting signals from a vehicle, to towed units or equipment including towed trailers, campers, vehicles and associated components has been described herein. These and other variations, which will be appreciated by those skilled in the art, are within the intended scope of this invention as claimed below. As previously stated, detailed embodiments of the present invention are disclosed herein; however, it is to be understood that the disclosed embodiments are merely exemplary of the invention that may be embodied in various forms.

INDUSTRIAL APPLICABILITY

The present invention finds applicability in the transportation and recreation industries.

What is claimed is:

1. An arrangement for accommodating electrical signal transmissions from a powered vehicle to a hitched unit interconnected with the vehicle, said arrangement comprising:
   an elongate load-bearing hitch member configured to be stationarily connected at a rear end of a powered vehicle in a predominantly horizontal orientation while extending widthwise to the vehicle, said hitch member having a wall portion that defines an inside cavity separated by said wall portion from an outside surface of the wall portion; and
   an electrical connector stationarily connected to said hitch member at an opening through said wall portion and electrical wiring interconnected with said electrical connector and extending within the inside cavity.

2. The arrangement according to claim 1, wherein said electrical connector includes a body portion located at least partially within said opening.

3. The arrangement according to claim 1, wherein said elongate hitch member extends between two opposite distal ends thereof and in an installed configuration on a powered vehicle, said elongate hitch member extends across a predominance of a width of the vehicle.

4. The arrangement according to claim 3, wherein each of said two opposite distal ends of said elongate hitch member terminates in a mounting bracket.

5. The arrangement according to claim 1, further comprising a receiving tube integrally constructed with said elongate hitch member and located at a lengthwise center of the elongate hitch member.

6. The arrangement according to claim 1, wherein said opening has a rough, laser-cut interior surface.

7. The arrangement according to claim 1, further comprising a second electrical connector stationarily connected to said hitch member at a second opening through said wall portion, said electrical wiring being interconnected between the two electrical connectors and extending across the inside cavity.

8. The arrangement according to claim 7, wherein said electrical wiring comprises at least one signal transmitting conduit located in the inside cavity and which is interconnected between the two electrical connectors.

9. The arrangement according to claim 7, wherein each of the electrical connectors has a body portion sized for retention in a respective opening through said wall portion.

10. The arrangement according to claim 1, wherein said electrical connector has a body portion sized for retention in said opening through said wall portion.

11. The arrangement according to claim 10, wherein part of said body portion of said electrical connector extends into the inside cavity of said hitch member.

12. The arrangement according to claim 10, wherein said body portion further comprises a flange abutting said outside surface about said opening.

13. The arrangement according to claim 1, further comprising a cargo carrier hitch mounted to a wheeled powered vehicle.

14. The arrangement according to claim 1, further comprising a wheeled trailer hitch mounted to a wheeled powered vehicle.

15. The arrangement according to claim 14, further comprising at least one wiring harness in electrical communication between said wheeled power vehicle and said wheeled trailer and interconnected with said electrical connector.

16. An assembly for transmitting signals from a vehicle to a towed unit, the assembly comprising:
   a trailer hitch having a wall separating an inside cavity from an outside surface, wherein said trailer hitch is mounted at a rear end of a powered vehicle and extends in a predominately horizontal orientation, widthwise to the powered vehicle;
   a connector disposed at the outside surface; and
   at least one signal transmitting conduit having an inside portion and an exposed portion, wherein the inside portion is located in the inside cavity, the exposed portion extending therefrom through an opening formed in the wall, the inside portion having connection to the connector and the exposed portion available for interconnection to a signal supply system of the vehicle, the connector providing connection to towed unit components for transmitting signals from the vehicle's signal supply system to the towed unit components.

17. The assembly according to claim 16, wherein signals for transmitting to the towed unit include electrical signals providing power to the towed unit.

18. The assembly according to claim 16, wherein the trailer hitch includes a cross tube comprising the wall separating the inside cavity from the outside surface and the cross tube extends between two opposite distal ends thereof across a predominance of a width of the vehicle.

19. The assembly according to claim 18, wherein the cross tube has a through-hole for connection of the inside portion to the connector covering the through-hole.

* * * * *